United States Patent [19]
Myers et al.

[11] Patent Number: 5,388,737
[45] Date of Patent: Feb. 14, 1995

[54] SPARE TIRE CARRIER

[75] Inventors: Billy R. Myers; Randall A. Waller, both of Murray, Ky.

[73] Assignee: Personnel Truck Leasing, Inc., Murray, Ky.

[21] Appl. No.: 93,057

[22] Filed: Jul. 16, 1993

[51] Int. Cl.$^6$ ............................................. B62D 43/00
[52] U.S. Cl. ............................... 224/42.26; 224/42.24; 224/42.25
[58] Field of Search ............... 224/42.24, 42.25, 42.26, 224/42.12, 42.03 R, 42.06, 315

[56] References Cited

U.S. PATENT DOCUMENTS

| | | | |
|---|---|---|---|
| 1,305,220 | 5/1919 | Kaplan | 224/42.25 |
| 1,312,829 | 8/1919 | Brokenshire | 224/42.26 |
| 3,301,450 | 1/1967 | Widner | 224/42.24 |
| 4,967,942 | 11/1990 | McGruder | 224/42.03 R |

FOREIGN PATENT DOCUMENTS 2197831  6/1988  United Kingdom ............. 224/42.12

Primary Examiner—Henry J. Recla
Assistant Examiner—David J. Walczak
Attorney, Agent, or Firm—Howard J. Greenwald

[57] ABSTRACT

A spare tire carrier containing a bracket, a holding plate, and a lock for attaching the holding plate to the bracket. The bracket contains a hook, a first tranverse plate, and a second transverse plate. The holding plate contains an orifice and a slot.

4 Claims, 5 Drawing Sheets

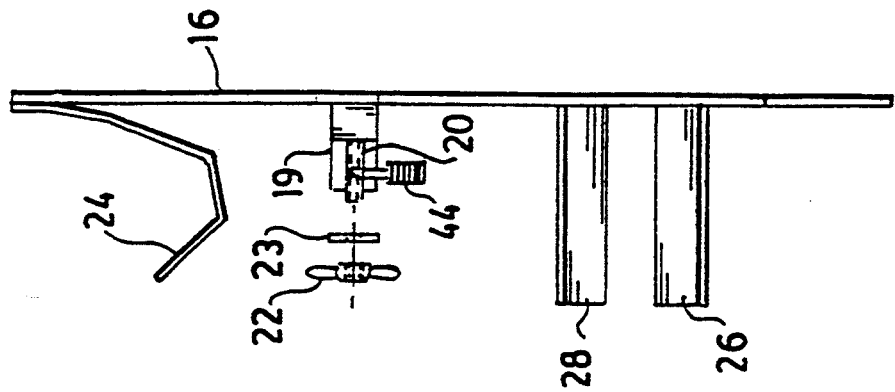
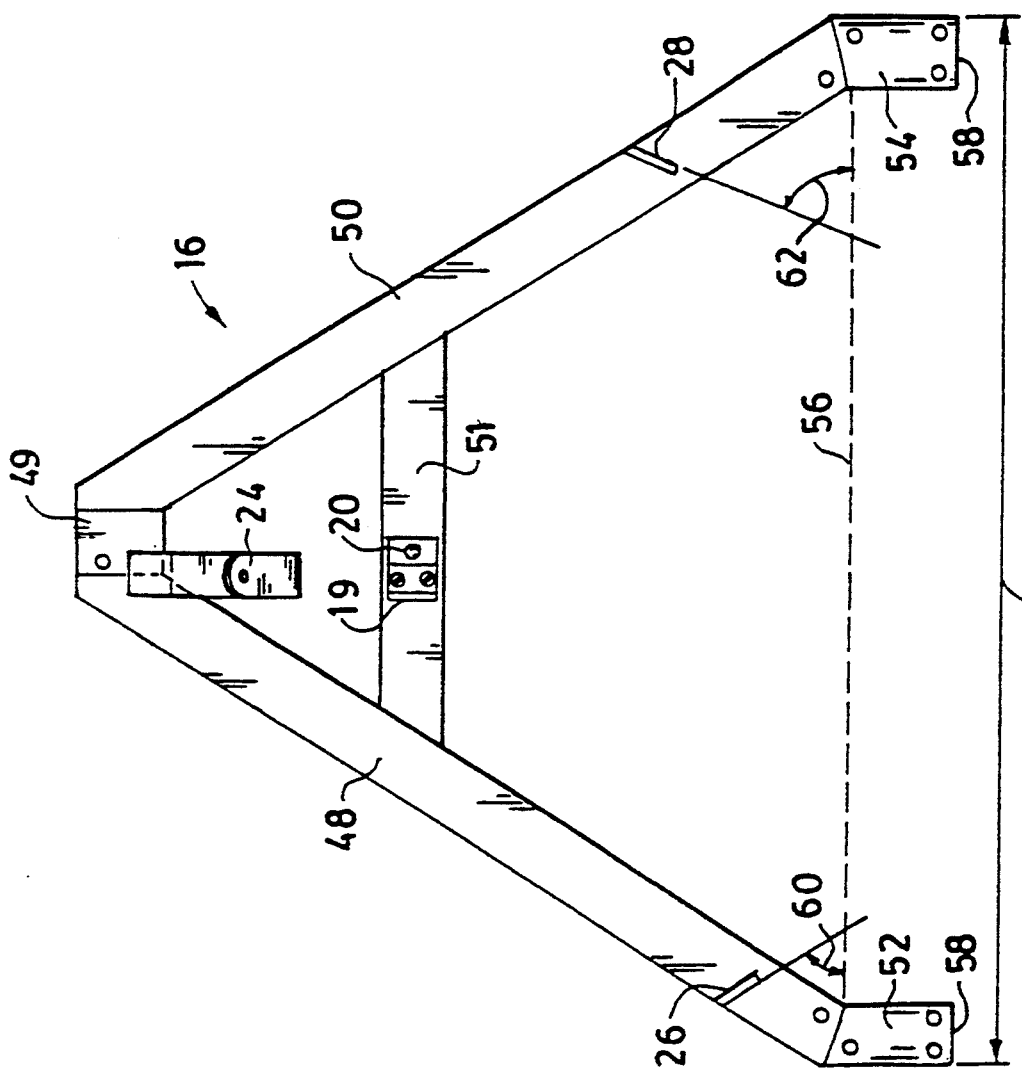

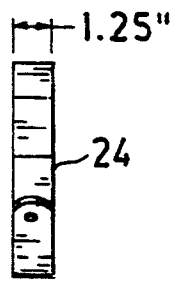
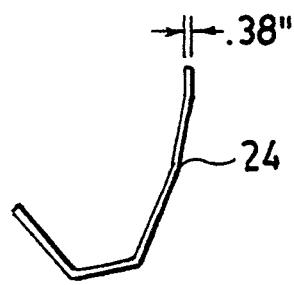
FIG. 12    FIG. 13
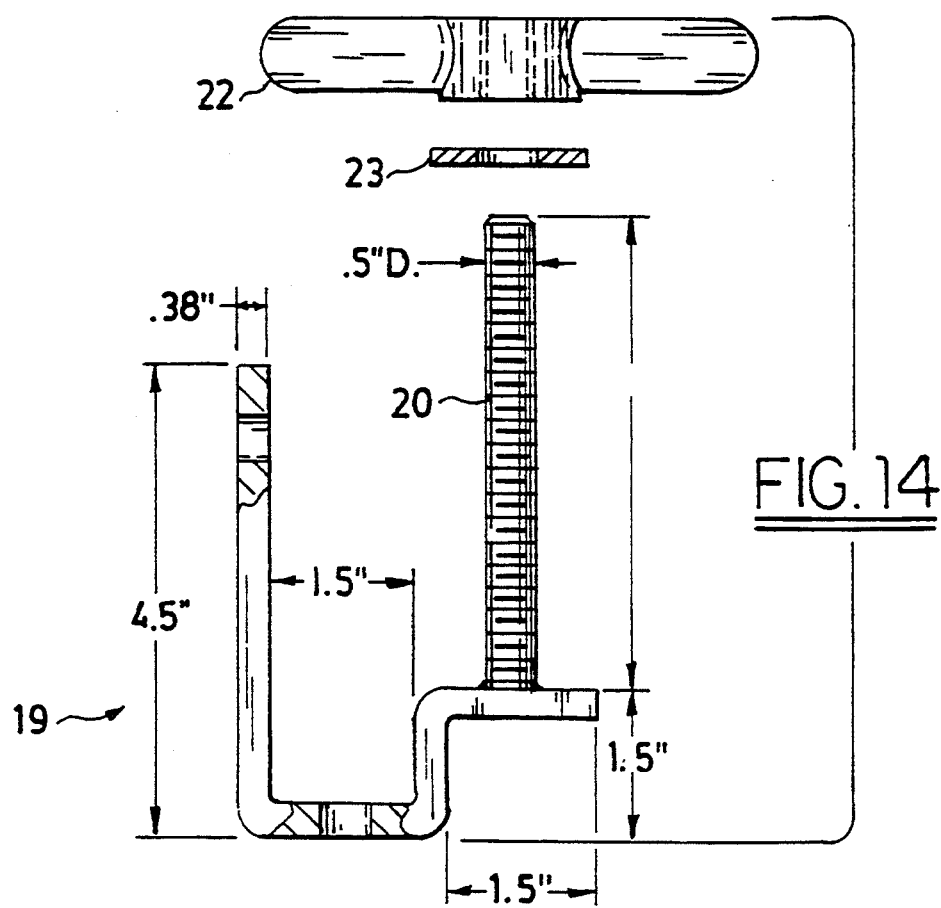
FIG. 14

1

SPARE TIRE CARRIER

FIELD OF THE INVENTION

A spare tire carrier which is adapted to be mounted behind the cab of a truck.

BACKGROUND OF THE INVENTION

Since the inception of inflatable tires, carrying a spare tire has always been perceived to be a necessary evil. However, associated with this need has been the logistical problem of where to unobtrusively mount the spare tire so that the vehicle space is not compromised and the spare tire will be disposed in such a manner that it is easily accessible yet relatively out of the way.

In 1969, in their U.S. Pat. No. 3,442,408, Jack H. Kost et al. disclosed a spare tire carrier comprising a cage for housing a tire, means on the bottom of the cage for mounting it on the frame of a vehicle, means within the cage for supporting a spare tire, pivotable latch means on the cage, and winch means. The device of this patent is relatively complicated, cumbersome, and expensive; and it contains a relatively large number of moving parts whose operation may be impeded after prolonged exposure to the elements.

In 1976, in his U.S. Pat. No. 3,940,178, Edward L. Levesque disclosed an apparatus for mounting a spare wheel in the cargo box of a pickup truck. At column 1 of his patent, in discussing the prior art devices, Levesque stated that: "Various methods are available for mounting spare wheels and tires on motor vehicles . . . With pickup trucks, a first method is to suspend the spare wheel and tire horizontally beneath the frame . . . The principal drawback of this mounting is that the spare wheel and tire is exposed to mud, dirt, salt, as well as water and the like, thereby causing the wheel and tire to corrode and otherwise deteriorate." However, Levesque's solution to this problem requires the use of storage space in the truck for the spare tire which could advantageously be used for other purposes.

The problems with exposing the spare tire assembly to the elements with prior art assemblies was also discussed in U.S. Pat. No. 4,076,158 of Barr. A column 1 of this patent, in discussing such prior art assemblies, the patentee disclosed that: ". . . such spare tires are generally mounted underneath the bed portion of the truck and as such are in proximity with the road. The tire is usually held in place by a nut engaging a threaded support member. Since the tire is exposed and in proximity with the road, . . . the tire and its associated mounting device are subjected to dirt, road grit, corrosive elements, natural elements, and the like. Use of a spare tire is generally not required for a substantial period of time . . . Thus, after the truck has been driven for some time and the use of the spare becomes necessary, the threaded member and the nut are commonly found to be in mechanically frozen contact thus rendering their separation difficult or impossible. If such is the case, it may become necessary to damage or destroy the nut and its associated support member so that the spare can be removed."

In 1983, in his U.S. Pat. No. 4,386,722, R. Nelson Gearhart disclosed a relatively complicated and expensive vehicle spare tire holder which contained a frame, an air-operated cylinder mounted on the frame, a push rod extending outwardly from the air-operated cylinder, and a wheel gripping means for engaging the sides of a wheel which is connected to the push rod. Because the holder of this system must be connected to a compressed source of air, complicated attachment, switching, and pressure monitoring means are required for its use.

In 1989, in his U.S. Pat. No. 4,873,851, Daniel W. Arnett disclosed what was then the state of the art with regard to spare tire carriers used on heavy trucks and trailers. At column 1 of this patent, Arnett disclosed that: "Heavy trucks, trailers therefor and similar vehicles are generally equipped with a spare tire mounting bracket for storing a spare tire against the undercarriage of the vehicle, typically the rear portion of the vehicle. The spare tire is frequently secured to the bracket by means of a steel cable or chain which can be wrapped around the tire and the bracket, and the ends of the chain can be secured by means of a padlock. However, with a pair of bolt cutters, a thief can readily remove the spare tire from the mounting bracket."

It is an object of this invention to provide a spare tire carrier which can be mounted on a truck in a position adapted to minimize contact with road dirt, salt, and debris.

It is another object of this invention to provide a spare tire carrier which is lockable.

It is yet another object of this invention to provide a spare tire carrier which is relatively lightweight.

It is yet another object of this invention to provide a spare tire carrier which is relatively simple and economical.

It is yet another object of this invention to provide a spare tire carrier which contains a minimal number of moving parts.

SUMMARY OF THE INVENTION

In accordance with this invention, there is provided spare tire carrier which is comprised of a substantially A-shaped bracket, a holding plate, and means for attaching the holding plate to the A-shaped bracket. The A-shaped bracket contains a hook, a first outwardly extending plate, a second outwardly-extending plate, and a cross member.

BRIEF DESCRIPTION OF THE DRAWINGS

The present invention will be more fully understood by reference to the following detailed description thereof, when read in conjunction with the attached drawings, wherein like reference numerals refer to like elements, and wherein:

FIG. 3 is a front view of the A-shaped bracket of the tire caddy of FIG. 1;

FIG. 4 is a side view of the A-shaped bracket of FIG. 3;

FIG. 12 is a front view of the hook of the tire caddy of FIG. 1;

FIG. 13 is a side view of hook of FIG. 12; and

FIG. 14 is an exploded side view of the hasp assembly of the tire caddy of FIG. 1.

DESCRIPTION OF THE PREFERRED EMBODIMENT

Figure 1:
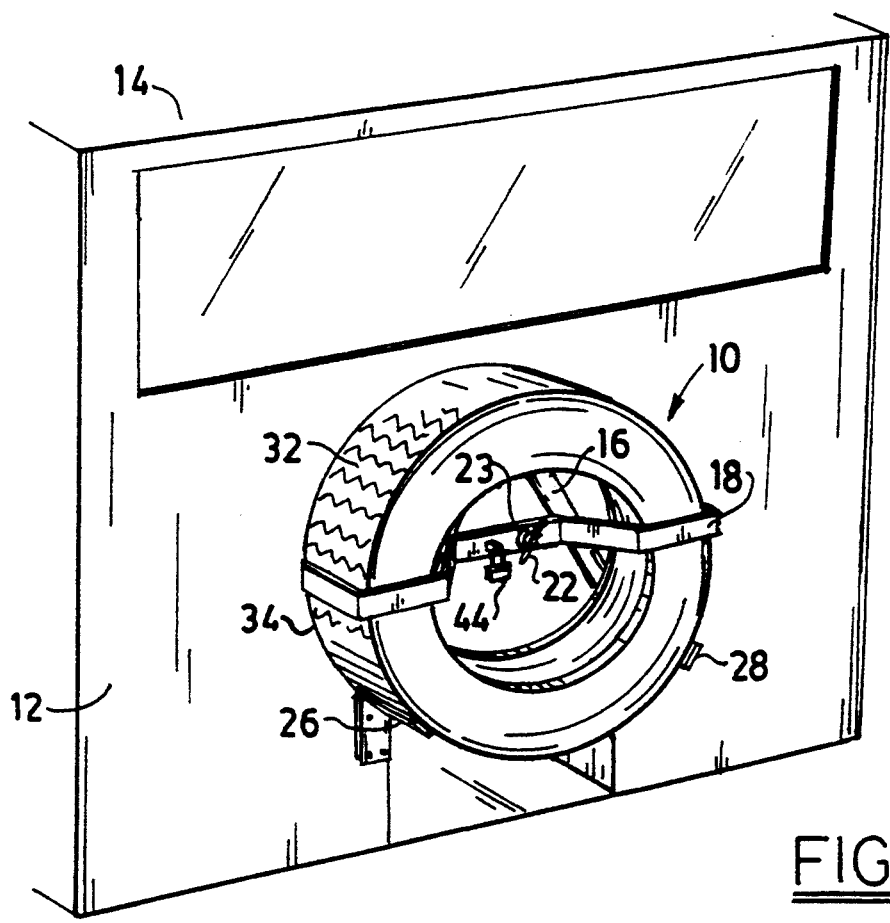
FIG. 1 is a perspective view of one preferred embodiment of applicants' tire caddy shown mounted on the back of a truck cab.

FIG. 1 is a perspective view of one preferred embodiment of tire caddy 10, illustrating how tire caddy 10 may be mounted on the cab 12 of a truck tractor 14.

As is known to those skilled in the art, a truck tractor is a vehicle of short wheelbase for hauling a semi-trailer. It carries a fixed, tilting mount, known as a fifth wheel, above the rear axle to support the front end of the semi-trailer. See, e.g., pages 127–128 of Volume 14 of the "McGraw-Hill Encyclopedia of Science & Technology" (McGraw Hill Book Company, N.Y., 1977). Reference also may be had to U.S. Pat. Nos. 5,060,964, 5,052,601, 5,035,439, 5,032,995, 5,027,031, 4,993,738, 4,969,690, 4,958,848, 4,943,798, 4,932,716, 4,874,184, 4,854,407, 4,838,754, 4,838,753, and the like. The disclosure of each of these United States patents is hereby incorporated by reference into this specification.

Figure 2:
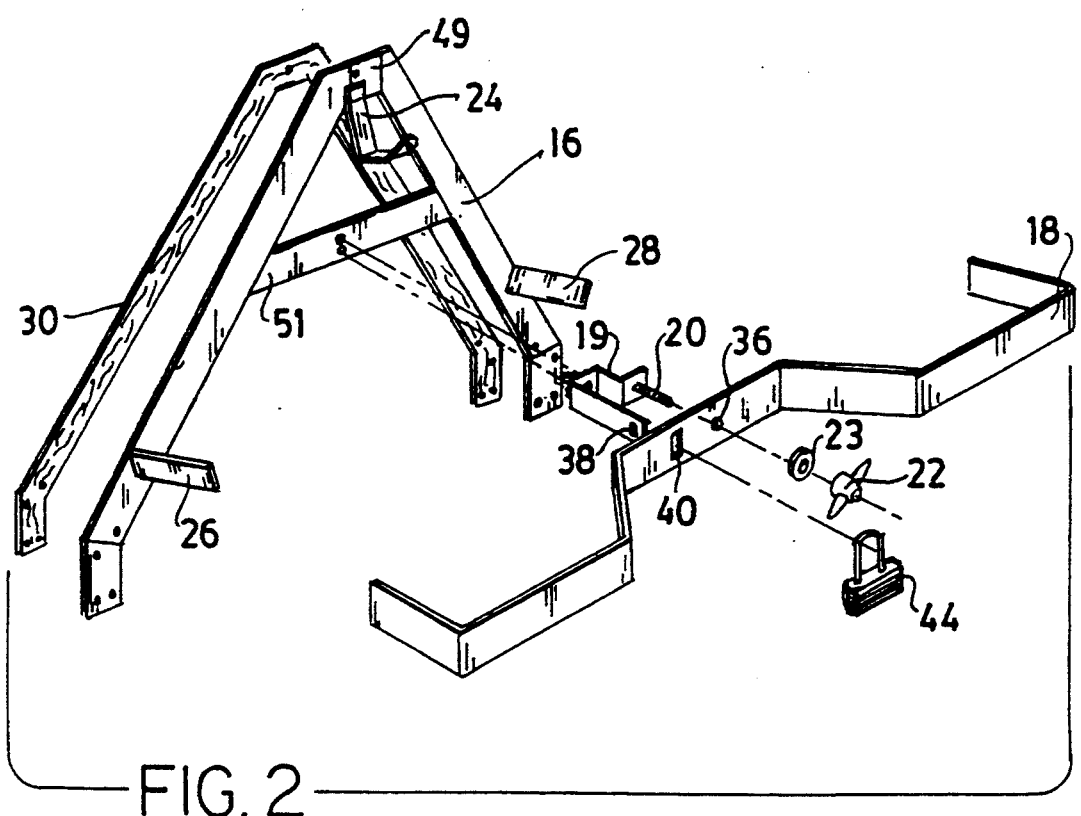
FIG. 2 is an exploded view of the tire caddy of FIG. 1.

Referring to FIGS. 1 and 2, it will be seen that this preferred embodiment of tire caddy 10 is comprised of a substantially A-shaped bracket 16 which has a removably attached holding plate 18 by means of a hasp 19 with bolt 20, wing nut 22, and washer 23.

The preferred embodiment of the tire caddy 10 illustrated in FIGS. 1 and 2 is comprised of an A-shaped bracket 16 which contains a hook 24, a first outwardly-extending plate 26, and a second outwardly-extending plate 28.

Referring again to FIG. 1, in one embodiment (not shown) it is preferred to attach A-shaped bracket 16 so that its rear surface (not shown) is contiguous with the surface of cab 12. In another embodiment, illustrated in FIG. 2, weatherstripping 30 is disposed between the rear surface (not shown) of substantially A-shaped bracket 16 and the cab 12. The weatherstripping is used to seal holes and as a cushion between the A-frame bracket 16 and the back of the cab 12.

Referring again to FIG. 1, a truck tire 32 is shown to indicate how it may be mounted on tire caddy 10. Referring to FIG. 1, it will be seen that the tire 32 may be suspended on hook 24 (not shown in FIG. 1) and that plates 26 and 28 are so disposed that they support the tread surface 34 of the tire 32. After the tire 32 is so suspended on hook 24 and contacted with plates 26 and 28, removable holding plate 18 is attached to the A-shaped bracket 16, thereby securing tire 32 between the A-shaped bracket 16 and the holding plate 18.

Tire caddy 10 is comprised of means for removably attaching holding plate 18 to substantially A-shaped bracket 16. Thus, by way of illustration, and in the preferred embodiment illustrated in FIG. 2, holding bracket 18 is preferably comprised of an orifice 36 through which hasp 19 may extend when A-shaped bracket 16 and holding bracket 18 are brought together to hold tire 32. After the holding bracket 18 has been inserted over the tire 32 and hasp 19 has been inserted through orifice 36, wing nut 22 and washer 23 may be used to tighten the tire caddy assembly 10 and firmly hold the tire 32 in place.

Tire caddy 10 is also provided with means for releasably locking the tire 32 in place. Referring to FIG. 2, it will be seen that substantially A-shaped bracket 16 is preferably comprised of a hasp 19 comprising an orifice 38 (also see FIG. 5), and that holding bracket 18 is comprised of a slot 40 adapted to receive such hasp 19 when A-shaped bracket 16 and holding bracket 18 are brought together to hold tire 32. After the holding bracket 18 has been inserted over the tire 32 and hasp 19 has been inserted through slot 40, lock 44 may be inserted through hasp orifice 38 to prevent the disassembly of the tire caddy assembly 10.

In one preferred embodiment, tire caddy 10 is built to accomodate up to an 11-24-5 tire. In this embodiment, most of the weight of the tire (about eighty pounds) is supported by the main brace around the engine tunnel, the substantially A-shaped bracket 16 is made from ⅜"×3" flat aluminum, the weight of the substantially A-shaped bracket 16 is from about 18 to about 20 pounds, and the holding plate 18 is also made from ⅜" by 3.0" flat aluminum.

FIG. 3 is a front view of the substantially A-shaped bracket 16. Referring to FIG. 3, it will be seen that bracket 16 preferably has a width 46 of from about 42 to about 52 inches and, preferably, from about 45 to about 49 inches. In one preferred embodiment, width 46 is about 47 inches.

Referring again to FIG. 3, it will be seen that bracket 16 is comprised of diverging arm 48, spacer 49, diverging arm 50, cross brace 51, and downwardly and substantially vertically extending legs 52 and 54. In one preferred embodiment, each of these parts is mig-welded together to form one unit.

By way of illustration and not limitation, and in the preferred embodiment illustrated in FIG. 3, (1) left leg 48 is mig-welded with piece 52, (2) right leg 50 is mig-welded with piece 54, (3) the left and right leg assemblies are then mig-welded together with brace 51, (4) the top of the right and left leg assemblies are meg-welded together with a 3.0"×⅜"×4.0" aluminum piece 49, (5) tire rest assembly 26 is mig-welded on left leg 48 to stand out, (6) tire rest assembly 28 is mig-welded on right leg 50 to stand out, and (7) hook 24 is mig-welded to piece 49 to fit inside the lip (not shown) of tire 32 (not shown).

Referring to FIG. 2, the A-shaped bracket 16 is preferably lined on its back surface now shown in FIG. 2, with weather stripping 30 to protect cab 12 and rack 16 from wearing through to tractor cab 14. In one preferred embodiment, the weather stripping is 3/16" thick by 3.0 inches wide and has a sticky side adapted to attach it to A-shaped bracket 16.

Referring again to FIG. 2, and in one illustrative embodiment, the holding plate 18 may be made from 3" by ⅜" by 53" flat aluminum bent into angles to fit snugly around the tire 32 (not shown in FIG. 2).

In the embodiment illustrated in FIGS. 3 and 4, plates 26 and 28 are preferably constructed from 6.0"×0.375"×3.0" flat aluminum which are attached to bracket 16 by mig-welding. In this preferred embodiment, a line 56 drawn substantially parallel to base 58 of tire caddy 10 will be at an acute angle 60 of from about 68 to about 78 degrees with plate 26 and, more preferably, from about 71 to about 75 degrees. In this preferred embodiment, line 56 will form an acute angle 62 of from about 52 to about 62 degrees with plate 28 and, more preferably, from about 55 to about 55 degrees.

Referring to FIG. 3, it will be seen that bracket 16 is comprised of cross-member 51. Cross-member 51 is preferably a piece of 3.0" by ⅜" by 14.5" on top cut to 18.75" on bottom cut; this member 51 is meg-welded to leg 48 and leg 50. Hook 24 is preferably a piece of ⅜" by 1.25" by 7.5" long aluminum that is bent into shape; it is then meg-welded to piece 49.

Figure 5:
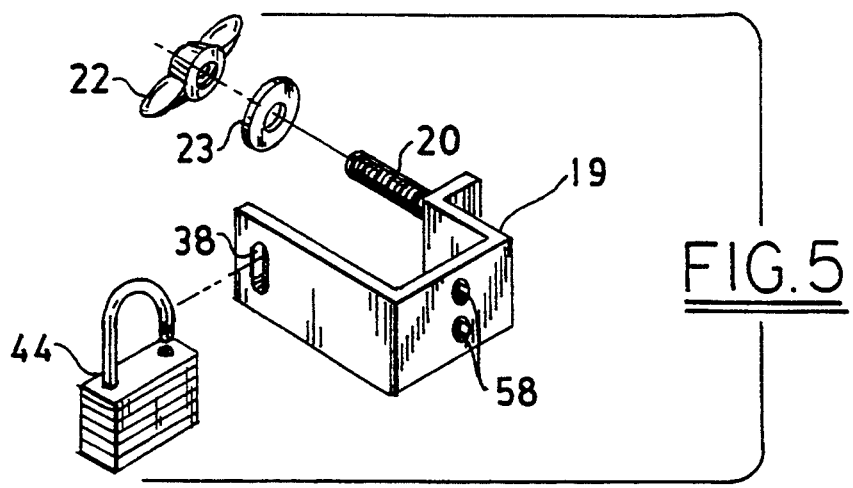
FIG. 5 is an exploded top view of a hasp assembly which may be used with the embodiment depicted in FIG. 1.

FIG. 5 is an exploded view of hasp assembly 19. In the embodiment illustrated in FIG. 5, a hasp 19 is illustrated which is preferably made from 1.0" by ⅜" by 5" flat iron bent with a ⅜" hole, and it has a 5.0" by 0.5" all threaded bolt 20 welded to it. The all threaded bolt 20 preferably has a 0.5" washer 23 and a 0.5" wing nut 22. The hasp 19 is preferably bolted to cross-member 51.

Figure 6:
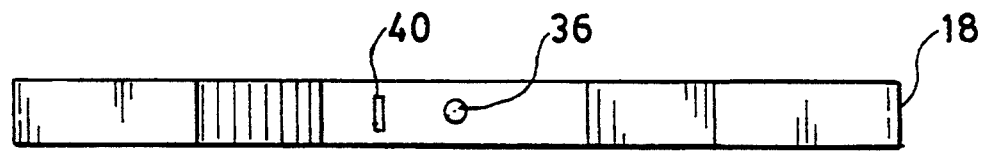
FIG. 6 is a front view of the holding bracket of the tire caddy of FIG. 1.
Figure 7:
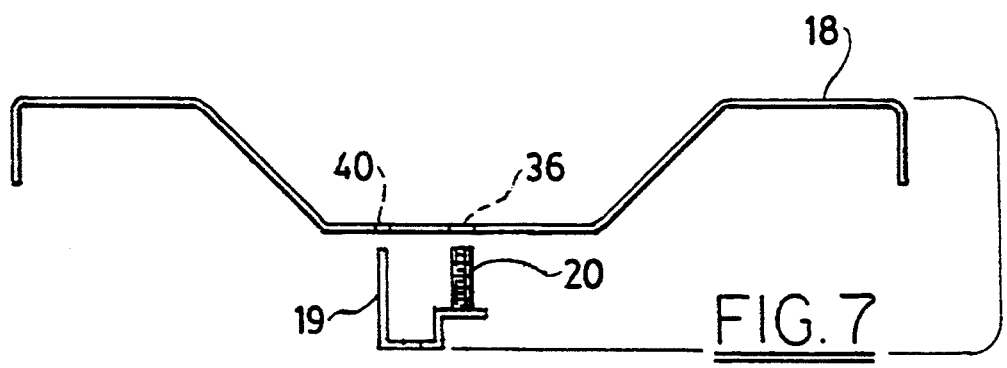
FIG. 7 is a top view of the holding bracket of FIG. 6.
Figure 8:
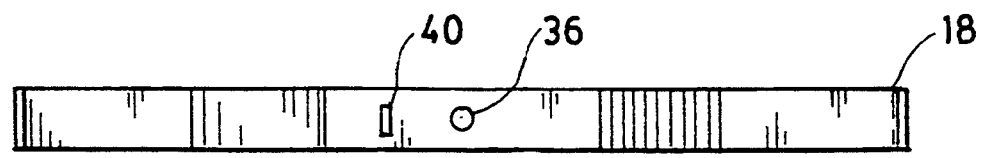
FIG. 8 is a back view of the holding bracket of FIG. 6.
Figure 9:
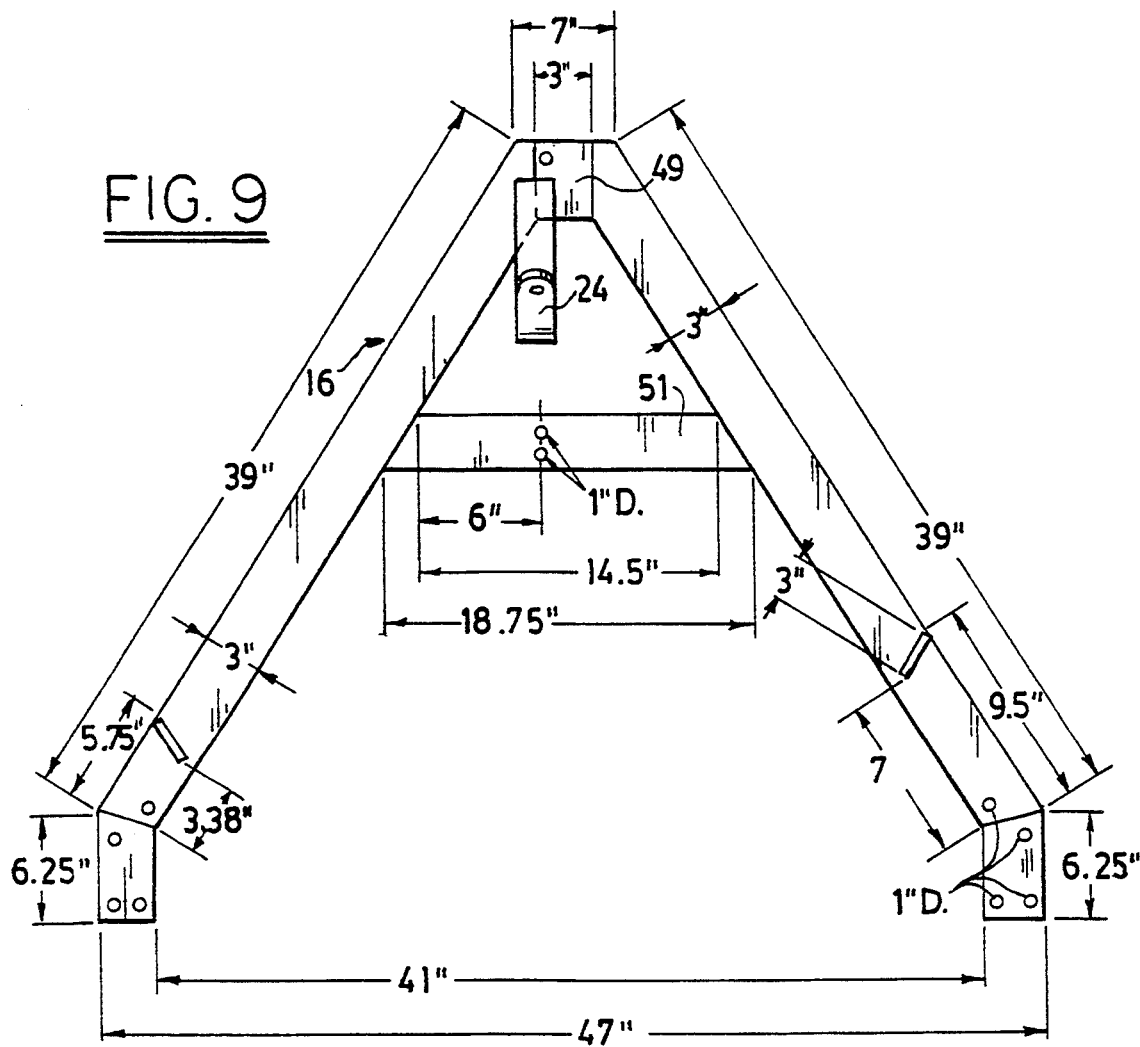
FIG. 9 is a front view of A-shaped bracket of the tire caddy of FIG. 1.
Figure 10:
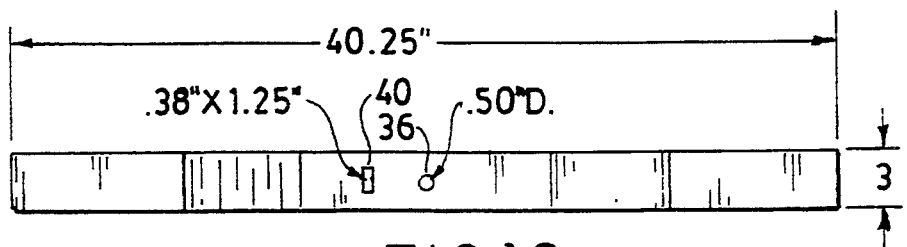
FIG. 10 is a front view of holding bracket of the tire caddy of FIG. 1.
Figure 11:
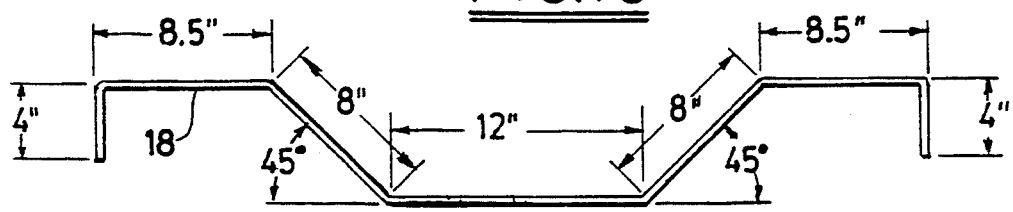
FIG. 11 is a top view of the holding bracket of FIG. 10.

FIGS. 6, 7, and 8 are front, top, and back views, respectively, of holding bracket 18. In the preferred embodiment illustrated in these Figures, holding bracket 18 is preferably made from ⅜" by 3"×53" flat aluminum bent into four 45-degree angles and two 90-degree angles.

FIGS. 9 through 14 illustrate the dimensions of one preferred aspect of the preferred embodiment of the tire caddy of FIG. 1.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

We claim:

1. A spare tire carrier comprised of a substantially A-shaped bracket, means for attaching said substantially A-shaped bracket to a motor vehicle, a holding plate removably attached to said substantially A-shaped bracket, means for removably attaching said holding plate to said substantially A-shaped bracket, and lock means for removably securing said holding plate to said substantially A-shaped bracket, wherein:

(a) said substantially A-shaped bracket is comprised of a first leg, a second leg, a first transverse plate for joining said first leg and said second leg, and a second transverse plate for joining said first leg and said second leg, wherein:

1. each of said first leg and said second leg has a proximal end and a distal end,
2. said first plate joins said proximal end of said first leg with said proximal end of said second leg,
3. said second plate joins said first leg with said second leg from a first point intermediate said proximal end and said distal end of said first leg to a second point intermediate said proximal end and said distal end of said second leg,
4. said second plate has a length which is greater than the length of said first plate, and
5. said first plate is attached to a hook adapted to support a tire;

(b) said spare tire carrier is comprised of a first means for supporting said spare tire and a second means for supporting said spare tire, wherein:

1. said first means for supporting said spare tire is attached to said first leg at a point intermediate said proximal end and said distal end of said first leg, and
2. said second means for supporting said spare tire is attached to said second leg at a point intermediate said proximal end and said distal end of said second leg and (c) said holding plate is comprised of an orifice adapted to receive a bolt and a slot adapted to receive a hasp.

2. The spare tire carrier as recited in claim 1, wherein said substantially A-shaped bracket consists essentially of aluminum.

3. The spare tire carrier as recited in claim 2, wherein said holding plate is an integral plate comprised of a first inwardly-extending section, a second substantially horizontally-extending section, a third diagonally-extending section, a fourth substantially horizontally-extending section, a fifth diagonally-extending section, a sixth substantially horizontally-extending section, and a seventh substantially inwardly-extending section, wherein said first section is integrally joined to said second section, said second section is integrally joined to said third section, said third section is integrally joined to said fourth section, said fourth section is integrally joined to said fifth section, said fifth section is integrally joined to said sixth section, and said sixth section is integrally joined to said seventh section.

4. The spare tire carrier as recited in claim 1, wherein said substantially A-shaped bracket is comprised of weather-stripping material.

* * * * *